United States Patent [19]

Imada et al.

[11] 4,344,981

[45] Aug. 17, 1982

[54] METHOD FOR MODIFYING SURFACE PROPERTIES OF A SHAPED ARTICLE OF A SILICONE

[75] Inventors: Kiyoshi Imada, Omiya; Susumu Ueno, Ibaraki; Yasuhide Nishina, Ibaraki; Hirokazu Nomura, Ibaraki, all of Japan

[73] Assignee: Shin-Etsu Chemical Co., Ltd., Tokyo, Japan

[21] Appl. No.: 158,407

[22] Filed: Jun. 11, 1980

[30] Foreign Application Priority Data

Jun. 18, 1979 [JP] Japan .................................. 54-76445

[51] Int. Cl.$^3$ ........................... B05D 3/06; B01J 19/08
[52] U.S. Cl. ...................................... 427/40; 204/165; 427/41
[58] Field of Search ..................... 427/38, 444, 40, 41; 204/165

[56] References Cited

U.S. PATENT DOCUMENTS 3,959,105  5/1976  Feneberg et al. .................. 204/165

*Primary Examiner*—Evan K. Lawrence
*Attorney, Agent, or Firm*—Toren, McGeady & Stanger

[57] ABSTRACT

A novel method is proposed for improving the surface properties or, in particular, for increasing the affinity to water of the surface of a shaped article made of a silicone, e.g. a silicone rubber. The inventive method comprises first exposing the surface of the shaped article of the silicone to low temperature plasma of an inorganic gas and then bringing the plasma-treated surface into contact with a liquid inert to the silicone which is an aqueous solution containing a surface active agent. The treated surface retains sufficient affinity to water even 6 months after the treatment.

3 Claims, No Drawings

METHOD FOR MODIFYING SURFACE PROPERTIES OF A SHAPED ARTICLE OF A SILICONE

BACKGROUND OF THE INVENTION

The present invention relates to a method for modifying surface properties of a shaped article of a silicone or, in particular, to a method for imparting durable affinity to water to the surface of a silicone rubber article.

Shaped articles of silicones, e.g. silicone resins and silicone rubbers, are widely used in various fields of industry in general owing to their excellent properties such as anti-weathering resistance, heat resistance, workability, mechanical properties, electrical properties and the like. Recently, silicone products have become a promising material and used in the medical field by virtue of their physiological inertness to the human body.

A problem in the use of silicone products is that the surface of a silicone article is generally water-repellent inherently so that the use of silicone products is necessarily limited when the surface of the article is desired to be wetted with water as is frequently the case in the medical field or others.

Such a problem of poor affinity to water and a problem of accumulation of static electricity on the surface are not limited to the silicone products but are generally encountered in most of synthetic polymer products. Several attempts have been made hitherto to modify the surface properties of shaped articles of plastic materials to be imparted with increased affinity to water. One of the approaches is to coat the surface of the article with an anti-static agent. This method is effective when the anti-static effect is desired to be instantly exhibited but is defective in the poor durability of the effect and the stickiness on the surface with eventual blocking of the coated articles in contact with each other. Alternatively, a method is proposed in which the shaped articles are fabricated with the resin or rubber composition admixed with an anti-static agent. The effect of this method is considerably durable and the surface resistivity of the shaped articles can be decreased to some extent but this method is impractical due to the insufficient affinity to water of the surface and low anti-static effect. An attempt to increase the amount of the anti-static agent in the resin or rubber composition is unsuccessful because of the appearance of stickiness on the surface leading to eventual blocking of the articles and the problem of bleeding or blooming of the anti-static agent per se on the surface in addition to the lowering of the heat resistance and workability as well as the surface coloring and increased susceptibility to stain.

It has been recently disclosed that the affinity to water of the surface of a plastic shaped article can be increased when the surface is exposed to an atmosphere of low temperature plasma leading to the decrease in the static electricity on the surface. This method of plasma treatment has not yet been established because of the relatively low effectiveness of the method. Moreover, when the surface of a silicone product is treated with low temperature plasma, affinity to water is indeed increased to some extent but the durability of the effect is low so that the once obtained affinity to water is rapidly lost in the lapse of days as has been recognized in the experiments by the inventors.

SUMMARY OF THE INVENTION

Thus, it is an object of the present invention to provide a novel and improved method for imparting very high and durable affinity to water to the surface of a shaped article of a silicone or, in particular, a silicone rubber free from the above described problems in the prior art methods.

The method of the invention, established as a result of the extensive investigations undertaken by the inventors for improving the surface properties of a shaped article made of a silicone, comprises the steps of (a) subjecting the surface of the shaped article of a silicone to exposure to low temperature plasma of an inorganic gas, and (b) bringing the thus plasma-treated surface of the shaped article into contact with a liquid inert to the silicone and containing a surface active agent.

Despite the simplicity of the method, the effectiveness of the inventive method is so remarkable and durable that the surface of the shaped article subjected to the treatment in accordance with the invention remains hydrophilic even after 6 months.

DETAILED DESCRIPTION OF THE PREFERRED EMBODIMENTS

What is meant by the term of silicone in this invention includes any kinds of organopolysiloxane materials well known in the art of organosilicon chemistry or technology. Various kinds of shaped articles can be the objective body of the inventive method. For example, shaped articles are prepared with a so-called silicone molding compound or a silicone rubber composition. The method of the present invention is applicable not only to the shaped articles prepared with the above mentioned silicone molding compound or silicone rubber composition but also to the surface coated with a silicone-based coating composition such as a silicone varnish. Furthermore, modified silicones such as epoxy-modified silicones and the like are also suitable for the application of the inventive method provided that the main constituent thereof is a silicone. The shape of the articles subjected to the method of the present invention is not limitative in so far as the whole surface thereof can be uniformly exposed to the low temperature plasma of a gas.

In the method of the present invention, the surface of the shaped article of a silicone is fist subjected to exposure to low temperature plasma of an inorganic gas. Low temperature plasma here implied is well known in the art as a gaseous atmosphere full of electrically charged species, where the temperature of the gaseous atmosphere is not excessively high in comparison with the ambient temperature irrespective of the energies of the charged species per se. Low temperature plasma is produced mainly by glow discharge in a gaseous atmosphere of a pressure in the range from about 0.001 to 10 Torr where the frequency of the electric power supply for the discharge is not limitative ranging from direct current to the microwave region. In particular, a frequency of the so-called high frequency is recommended due to the possibility of obtaining stable discharge. For example, a frequency of 13.56 MHz or 27.12 MHz is recommended since these frequencies are relatively free from statutory regulations for radio waves.

The shapes and arrangement of the electrodes for the plasma discharge are not limitative in so far as a stable plasma discharge can be ensured within the space in which the surface of the shaped article is exposed to the plasma atmosphere. Thus, a pair of exterior electrodes and a coiled electrode may be used in addition to a pair of inside electrodes according to particular types of the apparatuses for plasma generation. The electrodes may be connected to the high frequency generator either by capacitive coupling or by inductive coupling.

The intensity or power density of the low temperature plasma and the time for the plasma treatment are mutually interrelated parameters but extreme difficulties are encountered when the power density of low temperature plasma is to be determined explicitly. This is because of the very complicated nature of the plasma atmosphere which is beyond the understanding in the present status of the art. Therefore it is best to determine the time for the plasma treatment in advance by trial runs corresponding to the electric power supply and the particular articles under treatment. With a power density obtained in most of the currently available apparatuses for plasma generation, a time ranging between a few seconds and several tens of minutes is usually sufficient to obtain the desired effect of the inventive method. At any rate, it is a least requirement that the surface of the plasma-treated articles never undergoes thermal degradation by the heat evolved by the plasma discharge.

The other parameters that should be considered in the plasma treatment are the kind of the gaseous constituent and the pressure of the gaseous atmosphere in which low temperature plasma is generated. To ensure stability of the plasma discharge, the pressure of the gaseous atmosphere within the apparatus for plasma generation should be maintained in the range from about 0.001 to 10 Torr or, preferably, from about 0.01 to 1.0 Torr.

The gases to fill the apparatus for plasma generation should be inorganic since organic gases are liable to produce polymeric matters in the plasma condition which deposit on the surface of the article under treatment. Suitable inorganic gases are exemplified by helium, neon, argon, nitrogen, nitrous oxide, nitrogen dioxide, oxygen, air, chlorine, hydrogen chloride, carbon monoxide, carbon dioxide, hydrogen and the like. These gases may be used either singly or as a mixture of two kinds or more according to need. Among the above named gases, carbon monoxide gas or a gaseous mixture containing carbon monoxide is preferred because of the higher efficiency for an unknown reason.

The shaped article of the silicone having been exposed to low temperature plasma is then brought into contact with a liquid which is inert to the silicone, i.e. a liquid in which the silicone is not dissolved nor swollen. Such an inert liquid is exemplified by an aqueous solution containing a surface active agent, although water, methyl alcohol, ethyl alcohol, dioxane and the like can be used.

The temperature of the inert liquid when the plasma-treated shaped article is in contact therewith is preferably in the range from 0° C. to 50° C. but, most conveniently, the contacting is carried out at room temperature. The duration of contacting with the inert liquid is in the range from a few second to several minutes or at least 1 second although an excessively long time exerts no adverse effects. It is not always necessary that the shaped article after completion of the plasma treatment is immediately brought into contact with the inert liquid and the effectiveness is almost unchanged when the plasma-treated article is brought into contact with the liquid within 24 hours after completion of the plasma treatment.

The type of the surface active agent used in the inert liquid aqueous solution is not particularly limited and includes cationic, anionic, non-ionic and amphoteric surface active agents.

The cationic surface active agents suitable for use are exemplified by salts of primary amines, salts of secondary amines, salts of tertiary amines, quaternary ammonium salts and pyridinium salts and the anionic surface active agents are exemplified by sulfonated oils, soaps, sulfonated ester oils, sulfonated amide oils, sulfonated ester salts of olefins, sulfonated ester salts of aliphatic alcohols, ester salts of alkylsufuric acids, ethylsulfonic acid salts of fatty acids, salts of alkylsulfonic acids, salts of alkylnaphthalenesulfonic acids, salts of alkylbenzenesulfonic acids, succinic acid ester sulfonates and salts of phosphoric acid esters. The non-ionic surface active agents are exemplified by addition products of ethylene oxide with fatty acids, aliphatic amides, alkylphenols, alkylnaphthols, partial carboxylic acid esters of polyvalent alcohols and the like and block copolymers of ethylene oxide and propylene oxide and the amphoteric surface active agents are exemplified by derivatives of carboxylic acids and derivatives of imidazolines. These surface active agents are dissolved, dispersed or emulsified in water or a mixed solvent of water and an alcohol in a concentration of about 0.01 to 50% by weight or, preferably, 0.01 to 10% by weight.

No particular explanation may be necessary of the manner in which the plasma-treated shaped article of a silicone is brought into contact with the inert liquid. For example, the plasma-treated shaped article is contacted with the inert liquid by dipping, brushing, spraying, steaming or any other conventional method and the shaped article wet with the inert liquid is, if necessary, washed with water and dried completely at room temperature or at an elevated temperature.

The shaped article of the silicone treated as described above in accordance with the invention is imparted with very remarkably improved surface characteristics, in particular, affinity to water, as mentioned before so that the fields of application of silicone shaped articles are further enlarged to a great extent.

Following are the examples to illustrate the method of the present invention in further detail. In the examples, the affinity to water was evaluated by the contact angle of water on the surface. All of the "parts" in the examples are given for "parts by weight".

EXAMPLE 1

A silicone rubber composition was prepared by blending 100 parts of a methylvinylpolysiloxane gum containing 0.15% by moles (based on the total number of the organic groups) of vinyl groups, 60 parts of acetylene black and 0.7 part of dicumyl peroxide and an electroconductive silicone rubber sheet of 0.5 mm thickness was obtained by compression molding of the above composition at 170° C. for 5 minutes.

The above silicone rubber sheet was placed in a plasma generating chamber in which low temperature plasma was generated by applying high frequency electric power of 150 watts at 13.56 MHz while gaseous atmosphere in the chamber was kept under a pressure of 0.4 Torr by passing carbon monoxide gas under a reduced pressure so as that the surface of the silicone rubber sheet was exposed to the plasma atmosphere for about 10 minutes.

The thus plasma-treated silicone rubber sheet was dipped in an aqueous solution containing a sodium alkylbenzenesulfonate-higher alcohol surface active agent in a concentration of 1% for 1 minute followed by rinsing of the surface with water and complete air drying.

The contact angle of water was determined on the plasma-treated silicone rubber sheets without or with following treatment with the aqueous solution of the surface active agent. The measurement was carried out either immediately after the treatment or after lapse of days up to 6 months to give the results set out in Table 1 below.

EXAMPLE 2

The conditions for the preparation of the silicone rubber sheets and the plasma treatment of the sheet were about the same as in Example 1 except that the silicone rubber composition was composed of 100 parts of a emthylvinylpolysiloxane gum containing 0.2% by moles of vinyl groups, 40 parts of a fumed silica filler and 0.5 part of dicumyl peroxide and the high frequency electric power supply for the plasma generation was increased to 300 watts along with the decrease of the atmospheric pressure of carbon monoxide gas to 0.2 Torr.

The aqueous solution used for the treatment of the plasma-treated silicone rubber sheet contained 5% of a triethanolamine laurylsulfate surface active agent. The results of the determination of the contact angle of water on the plasma-treated silicone rubber sheets without or with following treatment with the aqueous solution are set out in Table 1 below.

EXAMPLE 3

The conditions for the preparation of the silicone rubber sheets and the plasma treatment of the sheet were about the same as in Example 1 except that the silicone rubber composition was composed of 100 parts of a methylvinylpolysiloxane gum containing 0.13% by moles of vinyl groups, 50 parts of a fumed silica filler and 0.8 part of dicumyl peroxide and the low temperature plasma was generated with increased power supply of 500 watts in an atmosphere under a pressure of 0.7 Torr kept by passing a gaseous mixture of 20:80 by volume of carbon monoxide and argon.

The aqueous solution used for the treatment of the plasma-treated silicone rubber sheets contained 3% of an alkylamine surface active agent. The results of the determination of the contact angle of water on the surfaces of the plasma-treated silicone rubber sheets without or with following treatment with the aqueous solution were as set out in Table 1 below for the sheets immediately after the treatment and after lapse of days up to 6 months.

TABLE 1

| Example No. | Treatment with aqueous solution | Initial value | After 1 month | After 3 months | After 6 months |
|---|---|---|---|---|---|
| 1 | No | 50° | 72° | 80° | 93° |
|   | Yes | 22° | 30° | 36° | 39° |
| 2 | No | 56° | 80° | 96° | 108° |
|   | Yes | 32° | 38° | 42° | 50° |
| 3 | No | 45° | 60° | 73° | 91° |
|   | Yes | 28° | 32° | 38° | 41° |

What is claimed is:

1. A method for modifying the surface properties of a shaped article of a silicone to increase its affinity for water and decrease its electrostatic surface charge which comprises the steps of:
   (a) subjecting the surface of the shaped article to exposure to a low temperature plasma of an inorganic gas, and
   (b) within 24 hours after completion of step (a), bringing the plasma-treated surface of the shaped article into contact with an aqueous solution containing a surface active agent, wherein the length of time in which the plasma-treated surface of the shaped article is in contact with the aqueous solution containing a surface active agent is at least one second, and the concentration of the surface active agent in the aqueous solution is in the range from about 0.01 to 10% by weight.

2. The method of claim 1 wherein step (b) is carried out at a temperature in the range from about 0° to 50° C.

3. The method as claimed in claim 1 wherein the inorganic gas is carbon monoxide or a gaseous mixture containing carbon monoxide.

* * * * *